Nov. 2, 1926.                           1,605,246
L. J. LEON
BIRDCAGE
Filed June 23, 1924
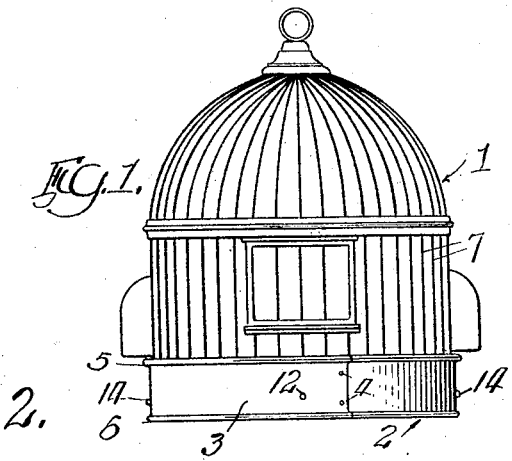
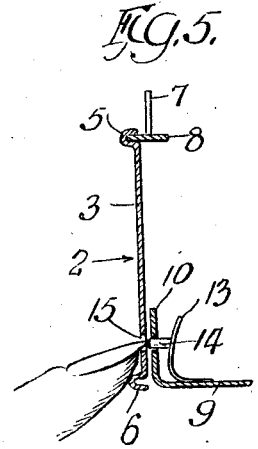
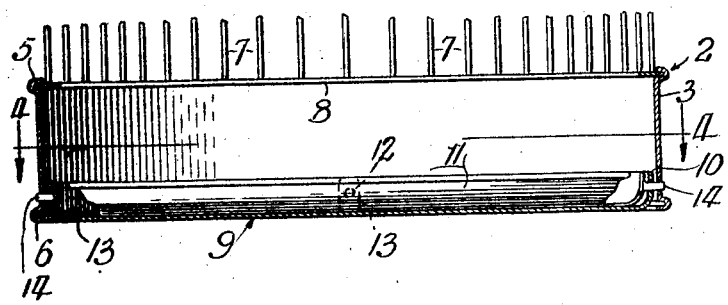
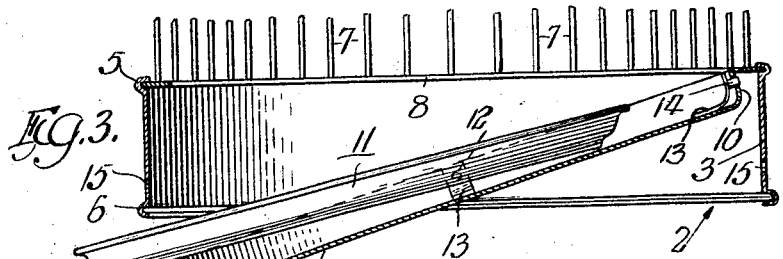
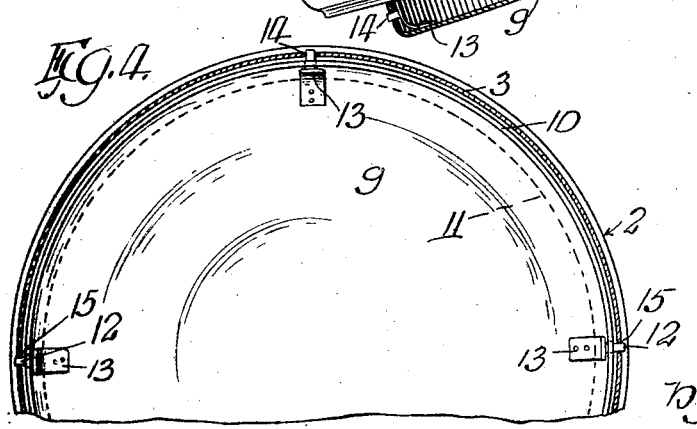
Inventor
L. J. Leon Patented Nov. 2, 1926.

1,605,246

UNITED STATES PATENT OFFICE.

LEWICKI J. LEON, OF CHICAGO, ILLINOIS.

BIRDCAGE.

Application filed June 23, 1924. Serial No. 721,675.

This invention relates to bird cages.

The main object of my invention is to provide the base of the cage with a hinged or pivoted bottom wall whereby the base may be opened for removal and insertion of the tray for cleaning or other purposes without separating the cage body and base and thus prevent escape of the bird by keeping relatively small the opening made on opening the base.

The design of structure devised in this connection is such that all or part of the base may be made of pyroxylin, celluloid, or like relatively light non-metallic material, and thus make the base light in weight, less expensive to manufacture, and easy to clean and keep sanitary.

The invention consists further in the matters hereinafter described and more particularly set forth in the appended claims.

In the accompanying drawings—

Fig. 1 is a side view of a bird cage embodying the features of my invention;

Fig. 2 is an enlarged vertical sectional view through the base of the cage;

Fig. 3 is a similar view showing the bottom wall of the base swung open so that the tray may be removed or inserted;

Fig. 4 is a fragmentary horizontal sectional view taken on line 4—4 of Fig. 2; and Fig. 5 is a vertical sectional view of one of the releasable fastenings to be hereinafter described.

As illustrated in Fig. 1, the cage comprises a body 1 and a base 2, both circular in form and with the top of the cage body 1 dome shape, as shown.

The base 2 has an upright marginal wall 3 made in the form of an annular band from a single strip of material, such as sheet brass or other sheet material, depending on the kind used. After being bent to form, the band 3 has its meeting ends secured together in any suitable manner, as by rivets 4, as shown in Fig. 1. The marginal wall 3 being in band or strip form, makes the wall open clear through, and beads 5, 6 are provided at or adjacent the upper and lower edges of said wall.

The cage body 1 consists of spaced wires 7, 7 secured to a member or ring 8 around its lower end, as shown in Fig. 2. The ring 8 is flat and is arranged horizontal so that it has an annular portion outside the wires 7, 7 for entering the channel formed by the upper bead 5 on the wall 3. In assembling, the wall 3 is applied about the ring 8 and its ends fixed together to lock the ring 8 in the bead 5 and hold the base 2 and cage body 1 against separation.

The base 2 has a bottom wall 9 made flat and circular to conform to the shape of the opening formed by the wall 3. The bottom wall 9 has an upstanding marginal flange 10, which fits inside the wall 3 when the bottom wall is closed and supports a tray 11, as shown in Fig. 2.

To open the base for the removal or insertion of the tray 11 without separating the cage body 1 and base 2, I pivot or hinge the bottom wall 9 to the wall 3 so that it may be swung into open position as indicated in Fig. 3, making an opening for the tray 11, as shown. The form of hinge or pivotal means shown in the drawings embraces two pivot pins 12, 12 carried by the bottom wall 9 at diametrically spaced points and engaging the marginal wall 3, as shown in Fig. 4. Catch means, to be presently described, are provided between the pivot pins 12, 12 to releasably hold the bottom wall 9 closed.

The pivot and catch means includes four spring arms 13, 13 inside the flange 10 and secured, in any suitable way, to the bottom wall 9 at or adjacent the base of said flange. Said arms 13, 13 have quarter spacing about the flange 10, and two of them carry the pivot pins 12, 12. The other two carry similar pins 14, 14. All the pins 12, 14 project through the flange 10 in apertures therein and enter registering holes 15 in the wall 3. These holes 15 have the same spacing as the arms 13. Being on spring arms 13, the pins 14 may be pushed inward to free their holes 15, as shown in Fig. 5, and release the bottom wall 9 for swinging into open position. One end of the bottom wall swings up into the base 2 and is stopped by contact of the catch pin 14 at such end with the ring 8, as shown in Fig. 3.

Should the occasion require, the bottom wall 9 may be completely removed from the base 2 by releasing all the pins 12, 14 from engagement with the wall 3. The spring arms 13 permit this, thus allowing for assemblement of the bottom wall 9 in the base when building the cage. The spring arms 13 do not project above the flange 10 and thus do not interfere with moving the tray 11 in or out of the base 2. The spring arms and pins, being spaced as shown, allow the bottom wall 9 to pivot about either pair or set of opposite pins. Moreover, being all the same facilitates assembly in the factory, as no attention need be paid to any exact position for each bottom wall, other than that its flange 10 be up.

By the structure shown and described, the base 2 may be easily and readily opened for insertion or removal of the tray 11 without separating the cage body and base. The opening made on swinging the bottom wall 9 open, need only be sufficient for the passage of the tray 11 and thus is kept relatively small, not allowing the bird to escape, as possible when the cage body and base are separated as heretofore. The marginal wall 3 having continuous engagement all around with the cage body 1, makes solid and strong the connection of the base with the cage ring 8. The wall 3 is arranged vertical and thus takes edgewise the weight of the completed cage when set on an underlying support. The design of my invention makes possible the use of relatively light, non-metallic material, as pyroxylin, celluloid, or the like. Said material is furnished commercially in varied colors, thus allowing the bases to be made in different colors to harmonize with the color scheme of the cages. The beads 5, 6 reinforce the wall 3, and the pins 12, 14 are housed by the wall 3 by being for the most part inside of the same. By such construction, the pins do not project beyond the base far enough to strike against and injure or mar other cages in handling during packing, tranportation, or around the store.

While I have shown and described herein the cage as being circular in shape, it is to be of course understood that the features of my invention could equally as well be applied to cages of other shapes. Moreover, I do not wish to be limited to the details of structure shown and described, for such may be variously changed and modified without departing from the spirit and scope of my invention.

I claim as my invention:

1. A base for bird cages having an upright marginal wall and a bottom wall, said bottom wall having a marginal flange fitting in said marginal wall, and means at said flange for pivoting the bottom wall to the marginal wall on the inside of the latter for opening the base through the bottom thereof.

2. A base for bird cages having an upright marginal wall and a bottom wall, said bottom wall having a marginal flange fitting in said marginal wall, means at said flange for pivoting the bottom wall to the marginal wall for opening the base through the bottom thereof, and catch means at said flange and engageable with the marginal wall from the inside thereof for releasably holding said bottom wall closed.

3. A base for bird cages having marginal and bottom walls, two sets of oppositely disposed spring arms carried by said bottom wall and arranged transverse to each other, and pins on said arms to engage said marginal wall so that the bottom wall may either be completely removed from said base or be pivoted in the same about one set of pins, the other set of pins releasably holding the bottom wall closed.

4. A base for bird cages having marginal and bottom walls, said bottom wall having an upright marginal flange extending about the same and fitting in said marginal wall, two sets of spring arms carried by said bottom wall inside said flange with the arms in each set oppositely disposed, pins on said arms and extending through apertures in said flange to engage holes in said marginal wall so that the bottom wall may pivot about either set of pins and be releasably engaged with the marginal wall by the other set.

5. A bird cage having a cage body and a base, said base having an upright marginal wall and a bottom wall, said marginal wall having permanent connection about its upper edge with the cage body, and said bottom wall having a surrounding flange fitting in the marginal wall and pivotally connected thereto at said flange for opening the base without separating the cage body and base.

6. A bird cage having a cage body and a base, said cage body having a ring about its lower end, said base having an upright marginal wall and a bottom wall, said marginal wall having a channel to receive said ring for permanently connecting the base and cage body together, and means pivoting the bottom wall to the marginal wall for opening the base without separating the cage body therefrom, said bottom wall striking against said ring at one side on being opened for limiting the extent to which the bottom wall may be opened.

In testimony that I claim the foregoing as my invention, I affix my signature this 20th day of June, 1924.

LEWICKI J. LEON.